(12) United States Patent
Sela

(10) Patent No.: US 8,762,627 B2
(45) Date of Patent: Jun. 24, 2014

(54) MEMORY LOGICAL DEFRAGMENTATION DURING GARBAGE COLLECTION

(75) Inventor: Rotem Sela, Haifa (IL)

(73) Assignee: SanDisk Technologies Inc., Plano, TX (US)

( * ) Notice: Subject to any disclaimer, the term of this patent is extended or adjusted under 35 U.S.C. 154(b) by 190 days.

(21) Appl. No.: 13/333,559

(22) Filed: Dec. 21, 2011

(65) Prior Publication Data

US 2013/0166818 A1 Jun. 27, 2013

(51) Int. Cl.
*G06F 12/02* (2006.01)

(52) U.S. Cl.
CPC .................................. *G06F 12/0253* (2013.01)
USPC ........................................................ 711/103

(58) Field of Classification Search
CPC ......................... G06F 12/0246; G06F 12/0253
See application file for complete search history.

(56) References Cited

U.S. PATENT DOCUMENTS

| | | |
|---|---|---|
| 5,535,369 A | 7/1996 | Wells et al. |
| 5,570,315 A | 10/1996 | Tanaka et al. |
| 5,630,093 A | 5/1997 | Holzhammer et al. |
| 5,774,397 A | 6/1998 | Endoh et al. |
| 5,860,124 A | 1/1999 | Matthews et al. |
| 5,960,169 A | 9/1999 | Styczinski |
| 6,046,935 A | 4/2000 | Takeuchi et al. |
| 6,069,827 A | 5/2000 | Sinclair |
| 6,373,746 B1 | 4/2002 | Takeuchi et al. |
| 6,456,528 B1 | 9/2002 | Chen |
| 6,522,580 B2 | 2/2003 | Chen et al. |
| 6,622,199 B1 | 9/2003 | Spall et al. |
| 6,715,027 B2 | 3/2004 | Kim et al. |
| 6,725,321 B1 | 4/2004 | Sinclair et al. |
| 6,771,536 B2 | 8/2004 | Li et al. |
| 6,781,877 B2 | 8/2004 | Cernea et al. |
| 7,012,835 B2 | 3/2006 | Gonzalez et al. |
| 7,154,781 B2 | 12/2006 | Lakhani et al. |
| 7,349,258 B2 | 3/2008 | Fong et al. |
| 7,420,867 B2 | 9/2008 | Brox |
| 7,433,993 B2 | 10/2008 | Sinclair |
| 7,451,265 B2 | 11/2008 | Traister et al. |
| 7,490,283 B2 | 2/2009 | Gorobets et al. |
| 7,552,280 B1 | 6/2009 | Naamad et al. |
| 7,783,851 B2 | 8/2010 | Im et al. |
| 7,873,782 B2 | 1/2011 | Terry et al. |
| 7,930,468 B2 | 4/2011 | Caulkins |
| 8,095,735 B2 | 1/2012 | Brewer et al. |
| 8,626,986 B2 | 1/2014 | Wu et al. |
| 2002/0099904 A1 | 7/2002 | Conley |
| 2003/0109093 A1 | 6/2003 | Harari et al. |
| 2003/0110343 A1 | 6/2003 | Hagiwara |
| 2003/0147278 A1 | 8/2003 | Tanaka et al. |
| 2003/0229753 A1 | 12/2003 | Hwang |
| 2004/0030847 A1 | 2/2004 | Tremaine |
| 2004/0260957 A1 | 12/2004 | Jeddeloh et al. |

(Continued)

FOREIGN PATENT DOCUMENTS

| | | |
|---|---|---|
| EP | 1 143455 A2 | 10/2001 |
| EP | 1 389755 A2 | 2/2004 |
| EP | 1 693759 A2 | 8/2006 |

*Primary Examiner* — Hiep Nguyen
(74) *Attorney, Agent, or Firm* — Brinks Gilson & Lione (57) ABSTRACT

A method and system defragments data during garbage collection. Garbage collection may be more efficient when the valid data that is aggregated together is related or logically linked. In particular, data from the same file or that is statistically correlated may be combined in the same blocks during garbage collection.

20 Claims, 6 Drawing Sheets

(56) References Cited

U.S. PATENT DOCUMENTS

| | | |
|---|---|---|
| 2005/0144361 A1 | 6/2005 | Gonzalez et al. |
| 2005/0144363 A1 | 6/2005 | Sinclair |
| 2005/0144365 A1 | 6/2005 | Gorobets et al. |
| 2005/0195635 A1 | 9/2005 | Conley et al. |
| 2005/0204187 A1 | 9/2005 | Lee et al. |
| 2006/0020744 A1 | 1/2006 | Sinclair et al. |
| 2006/0031593 A1 | 2/2006 | Sinclair |
| 2006/0047800 A1 | 3/2006 | Caveney et al. |
| 2006/0155922 A1 | 7/2006 | Gorobets et al. |
| 2006/0161724 A1 | 7/2006 | Bennett et al. |
| 2006/0161728 A1 | 7/2006 | Bennett et al. |
| 2006/0184719 A1 | 8/2006 | Sinclair |
| 2006/0285397 A1 | 12/2006 | Nishihara et al. |
| 2007/0033323 A1 | 2/2007 | Gorobets |
| 2007/0033330 A1 | 2/2007 | Sinclair et al. |
| 2007/0033378 A1 | 2/2007 | Sinclair et al. |
| 2007/0136555 A1 | 6/2007 | Sinclair |
| 2007/0239928 A1 | 10/2007 | Gera et al. |
| 2008/0034154 A1 | 2/2008 | Lee et al. |
| 2008/0082736 A1 | 4/2008 | Chow et al. |
| 2008/0094952 A1 | 4/2008 | Brondijk et al. |
| 2008/0155301 A1 | 6/2008 | Ahvenainen et al. |
| 2008/0172431 A1 | 7/2008 | Stephens et al. |
| 2008/0209109 A1 | 8/2008 | Lasser |
| 2008/0270706 A1 | 10/2008 | Fair et al. |
| 2008/0279005 A1 | 11/2008 | France |
| 2008/0288717 A1 | 11/2008 | Torabi |
| 2008/0307155 A1 | 12/2008 | Sinclair |
| 2008/0307164 A1 | 12/2008 | Sinclair |
| 2008/0307192 A1 | 12/2008 | Sinclair et al. |
| 2008/0320209 A1 | 12/2008 | Lee et al. |
| 2009/0006720 A1 | 1/2009 | Traister |
| 2009/0089482 A1 | 4/2009 | Traister |
| 2009/0157994 A1 | 6/2009 | Hampel et al. |
| 2009/0172258 A1 | 7/2009 | Olbrich et al. |
| 2009/0172263 A1 | 7/2009 | Olbrich et al. |
| 2009/0196102 A1 | 8/2009 | Kim |
| 2009/0271562 A1 | 10/2009 | Sinclair |
| 2011/0138100 A1 | 6/2011 | Sinclair |
| 2012/0005405 A1 | 1/2012 | Wu et al. |
| 2012/0005406 A1* | 1/2012 | Hutchison et al. ............ 711/103 |
| 2012/0084489 A1 | 4/2012 | Gorobets et al. |
| 2012/0102276 A1* | 4/2012 | Haines et al. ................. 711/154 |
| 2012/0110239 A1* | 5/2012 | Goss et al. ..................... 711/103 |

* cited by examiner

MEMORY LOGICAL DEFRAGMENTATION DURING GARBAGE COLLECTION

TECHNICAL FIELD

This application relates generally to memory devices. More specifically, this application relates to defragmentation during garbage collection in reprogrammable non-volatile semiconductor flash memory.

BACKGROUND

Non-volatile memory systems, such as flash memory, have been widely adopted for use in consumer products. Flash memory may be found in different forms, for example in the form of a portable memory card that can be carried between host devices or as a solid state disk (SSD) embedded in a host device. When writing data to a conventional flash memory system, a host typically writes data to, and reads data from, addresses within a logical address space of the memory system. The memory system then commonly maps data between the logical address space and the physical blocks or metablocks of the memory, where data is stored in fixed logical groups corresponding to ranges in the logical address space. Generally, each fixed logical group is stored in a separate physical block of the memory system. The memory system keeps track of how the logical address space is mapped into the physical memory. The host keeps track of the addresses of its data files within the logical address space but the memory system generally operates without knowledge of this mapping.

A drawback of memory systems that operate in a logical address space is fragmentation. Data written by a host file system may often be fragmented in logical address space, where many fixed logical groups are only partially updated with new data. The fragmentation may occur as a result of cumulative fragmentation of free space by the host file system, and possibly even as a result of inherent fragmentation of individual files by the host file system. Data previously written may become obsolete due to deletion and cause further fragmentation. Garbage collection may be needed to aggregate obsolete data together in blocks to be erased. The performance of a memory system may be degraded by increased fragmentation and frequent garbage collection.

SUMMARY

In order to address the problems noted above, a method and system for defragmenting a memory device during garbage collection is disclosed. As described below with respect to FIGS. 4-5, garbage collection may be a consolidation or aggregation of valid data from blocks that have a mixture valid data and obsolete data that results in more free blocks since there are fewer blocks that have a mixture of both valid and obsolete data.

According to a first aspect, a method is disclosed for initiating a garbage collection operation that includes identifying valid data that is stored with obsolete data in a block. Any correlations between the identified valid data to be copied are determined, and the identified valid data to be copied is aggregated based on the determined correlations. The aggregation includes combining correlated data in a block during garbage collection.

According to another aspect, a memory system includes a non-volatile storage having an array of memory blocks with logical block address (LBA) addresses for data stored in the blocks, and a controller in communication with the blocks. The controller is configured to receive a write instruction for data to be written, identify blocks that include valid data and obsolete data, and aggregate valid data from the identified blocks. The aggregation further comprises an identification of relationships among the valid data wherein the valid data that is related is aggregated together.

According to another aspect, a method for operating a memory system is disclosed including a controller and blocks of memory in a non-volatile storage device. The controller is configured for identifying the blocks that include valid data and obsolete data, analyzing the blocks that include valid data and obsolete data to identify valid data in those blocks that is correlated, and for aggregating valid data. The aggregation includes combining the valid data that is correlated.

BRIEF DESCRIPTION OF THE PRESENTLY PREFERRED EMBODIMENTS

Figure 1:
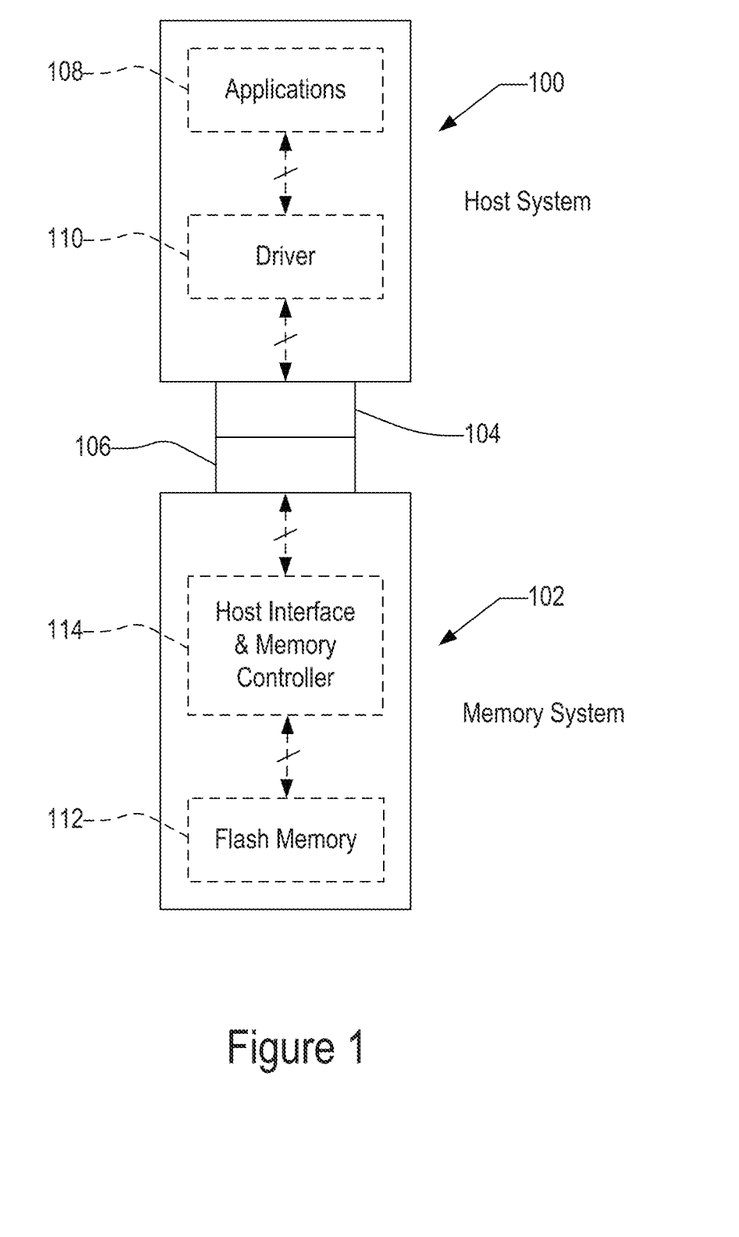
FIG. 1 is a block diagram of a host connected with a memory system having non-volatile memory.
Figure 2:
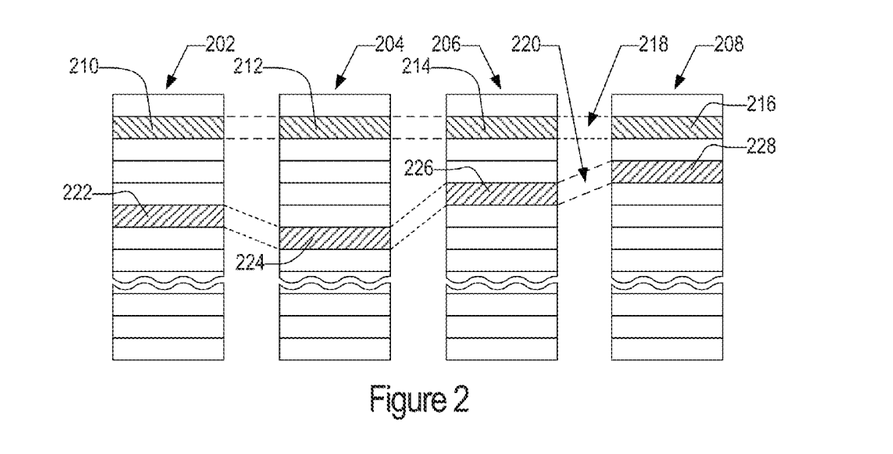
FIG. 2 illustrates an example physical memory organization of the system of FIG. 1.
Figure 3:
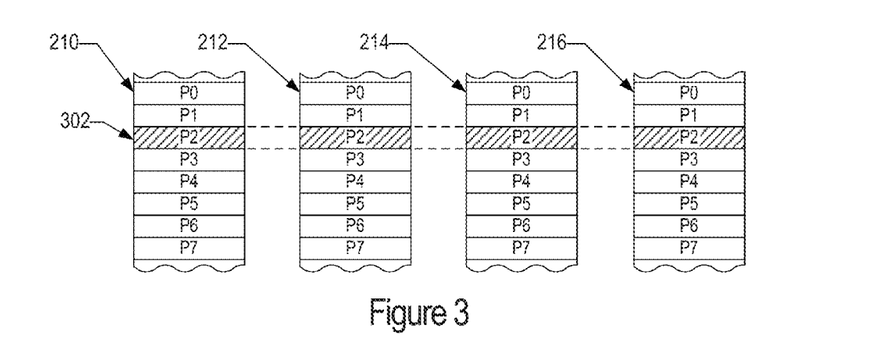
FIG. 3 shows an expanded view of a portion of the physical memory of FIG. 2.

A flash memory system suitable for use in implementing aspects of the invention is shown in FIGS. 1-3. A host system 100 of FIG. 1 stores data into and retrieves data from a flash memory 102. The flash memory may be embedded within the host, such as in the form of a solid state disk (SSD) drive installed in a personal computer. Alternatively, the memory 102 may be in the form of a flash memory card that is removably connected to the host through mating parts 104 and 106 of a mechanical and electrical connector as illustrated in FIG. 1. A flash memory configured for use as an internal or embedded SSD drive may look similar to the schematic of FIG. 1, with one difference being the location of the memory system 102 internal to the host. SSD drives may be in the form of discrete modules that are drop-in replacements for rotating magnetic disk drives.

Examples of commercially available removable flash memory cards include the CompactFlash (CF), the MultiMediaCard (MMC), Secure Digital (SD), miniSD, Memory Stick, SmartMedia, TransFlash, and microSD cards. Although each of these cards may have a unique mechanical and/or electrical interface according to its standardized specifications, the flash memory system included in each may be similar. These cards are all available from SanDisk Corporation, assignee of the present application. SanDisk also provides a line of flash drives under its Cruzer trademark, which are hand held memory systems in small packages that have a Universal Serial Bus (USB) plug for connecting with a host by plugging into the host's USB receptacle. Each of these memory cards and flash drives includes controllers that interface with the host and control operation of the flash memory within them.

Host systems that may use SSDs, memory cards and flash drives are many and varied. They include personal computers (PCs), such as desktop or laptop and other portable computers, tablet computers, cellular telephones, smartphones, personal digital assistants (PDAs), digital still cameras, digital movie cameras, and portable media players. For portable memory card applications, a host may include a built-in receptacle for one or more types of memory cards or flash drives, or a host may require adapters into which a memory card is plugged. The memory system may include its own memory controller and drivers but there may also be some memory-only systems that are instead controlled by software executed by the host to which the memory is connected. In some memory systems containing the controller, especially those embedded within a host, the memory, controller and drivers are often formed on a single integrated circuit chip.

The host system 100 of FIG. 1 may be viewed as having two major parts, insofar as the memory 102 is concerned, made up of a combination of circuitry and software. They are an applications portion 108 and a driver portion 110 that interfaces with the memory 102. In a PC, for example, the applications portion 108 can include a processor running word processing, graphics, control or other popular application software. In a camera, cellular telephone or other host system that is primarily dedicated to performing a single set of functions, the applications portion 108 includes the software that operates the camera to take and store pictures, the cellular telephone to make and receive calls, and the like.

The memory system 102 of FIG. 1 includes flash memory 112, and circuits 114 that both interface with the host to which the card is connected for passing data back and forth and control the memory 112. The controller 114 typically converts between logical addresses of data used by the host 100 and physical addresses of the memory 112 during data programming and reading.

FIG. 2 conceptually illustrates an organization of the flash memory cell array 112 (FIG. 1) that is used as an example in further descriptions below. The flash memory cell array 112 may include multiple memory cell arrays which are each separately controlled by a single or multiple memory controllers 114. Four planes or sub-arrays 202, 204, 206, and 208 of memory cells may be on a single integrated memory cell chip, on two chips (two of the planes on each chip) or on four separate chips. The specific arrangement is not important to the discussion below. Of course, other numbers of planes, such as 1, 2, 8, 16 or more may exist in a system. The planes are individually divided into groups of memory cells that form the minimum unit of erase, hereinafter referred to as blocks. Blocks of memory cells are shown in FIG. 2 by rectangles, such as blocks 210, 212, 214, and 216, located in respective planes 202, 204, 206, and 208. There can be any number of blocks in each plane.

As mentioned above, the block of memory cells is the unit of erase, the smallest number of memory cells that are physically erasable together. For increased parallelism, however, the blocks are operated in larger metablock units. One block from each plane is logically linked together to form a metablock. The four blocks 210, 212, 214, and 216 are shown to form one metablock 218. All of the cells within a metablock are typically erased together. The blocks used to form a metablock need not be restricted to the same relative locations within their respective planes, as is shown in a second metablock 220 made up of blocks 222, 224, 226, and 228. Although it is usually preferable to extend the metablocks across all of the planes, for high system performance, the memory system can be operated with the ability to dynamically form metablocks of any or all of one, two or three blocks in different planes. This allows the size of the metablock to be more closely matched with the amount of data available for storage in one programming operation.

The individual blocks are in turn divided for operational purposes into pages of memory cells, as illustrated in FIG. 3. The memory cells of each of the blocks 210, 212, 214, and 216, for example, are each divided into eight pages P0-P7. Alternatively, there may be 16, 32 or more pages of memory cells within each block. The page is the unit of data programming and reading within a block, containing the minimum amount of data that are programmed or read at one time. However, in order to increase the memory system operational parallelism, such pages within two or more blocks may be logically linked into metapages. A metapage 302 is illustrated in FIG. 3, being formed of one physical page from each of the four blocks 210, 212, 214, and 216. The metapage 302, for example, includes the page P2 in each of the four blocks but the pages of a metapage need not necessarily have the same relative position within each of the blocks. A metapage may be the maximum unit of programming.

Figure 4:
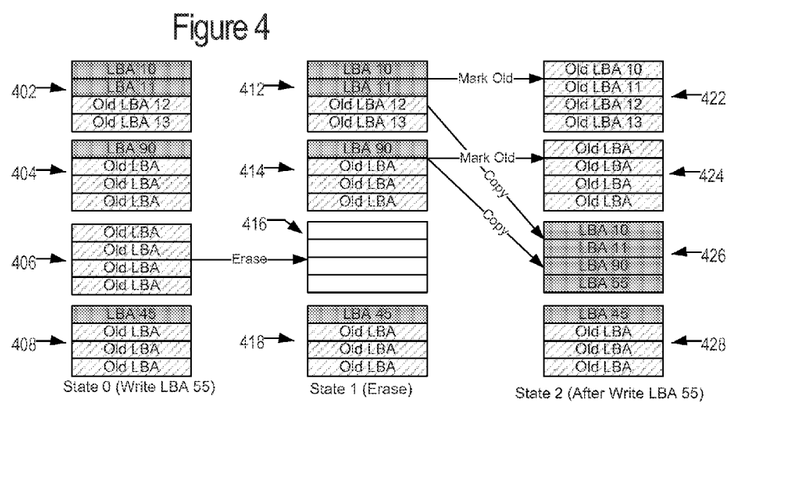
FIG. 4 illustrates an example of garbage collection.
Figure 5:
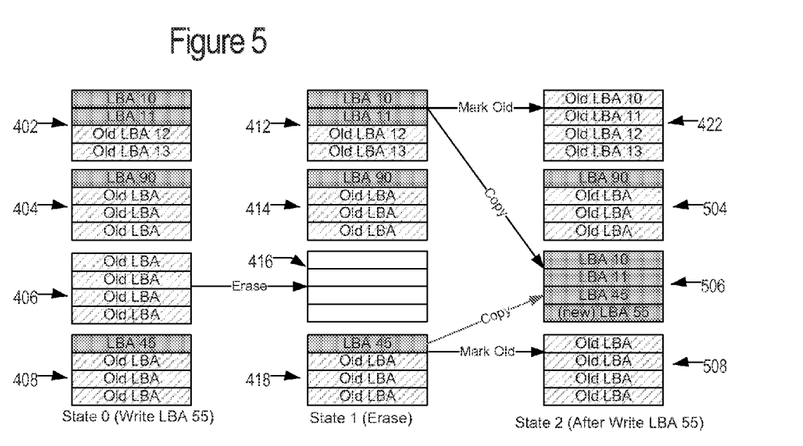
FIG. 5 illustrates defragmentation during garbage collection.

FIGS. 4 and 5 illustrate garbage collection performed by the memory system illustrated in FIG. 1. In particular, the flash memory 112 may be subject to garbage collection performed by the controller 114. FIG. 3 illustrates blocks with eight pages, while FIGS. 4 and 5 illustrate blocks with four pages. Alternatively, there may be 16, 32 or more pages of memory cells within each block. Although FIGS. 2 and 3 illustrate metapages and metablocks, FIGS. 4 and 5 merely describe garbage collection for individual blocks by copying individual pages rather than metablocks or metapages, but the concepts described are applicable to any blocks or pages.

FIG. 4 illustrates an example of garbage collection. As discussed above, FIG. 2 illustrates blocks 210, 212, 214, 216 that include pages P0-P7. Likewise, FIG. 4 illustrates a set of four blocks that are shown in three different states (States 0, 1, and 2). In the embodiment shown, each block includes four pages, but the number of pages may be more or less. The pages are addressed using logical block addressing (LBA) that specifies the location of each block of data using a simple linear addressing scheme. For example, the blocks may be located by an integer index. With LBA, each address may refer to a single block. In alternative examples, different addressing schemes may be utilized for the organization of memory, and in particular, the organization of pages within blocks.

Each of the four blocks in FIG. 4 are labeled separately in each of the three states for ease of reference, but they may represent the same four blocks with memory contents during the three different states. At State 0, blocks 402, 404, 406, 408 include a mix of obsolete data (Old LBA) and valid/good data that is labeled by its LBA number. Obsolete data may also be referred to as old, invalid, or stale data. Block 402 includes two blocks of valid data, LBA 10 and LBA 11, along with two blocks of obsolete data (Old LBA). Block 404 includes one block of valid data, LBA 90 and three blocks of obsolete data. Block 406 includes four blocks of obsolete data. Block 408 includes one block of valid data, LBA 45, and three blocks of obsolete data.

State 0 reflects the state of blocks 402, 404, 406, 408 before receiving an instruction to write new data, LBA 55. In order to write LBA 55, there must be an empty block to write to. Accordingly, State 1 illustrates the erasing of block 406 to produce empty block 416. In particular, block 402 remains unchanged and is shown as block 412, block 404 remains unchanged and is shown as block 414, and block 408 remains unchanged and is shown as block 418. Block 416 is the erased version of block 406. Block 406 included only obsolete data, so it was erased in State 1 as block 416. Block 416 is empty in State 1 and available to have data written to it since it is erased and empty.

State 2 reflects the four blocks after LBA 55 is written. In particular, State 2 illustrates garbage collection (GC) that occurs for existing blocks. In particular, blocks 412, 414, and 418 each include a mixture of both valid data and obsolete data and garbage collection may include an operation for consolidating valid data and/or consolidating obsolete data. In one embodiment, the consolidation or aggregation of valid data may result in the aggregation of obsolete data because the valid data in blocks with both valid and obsolete data is moved out, so that only obsolete data remains in the block. Blocks with only obsolete data can be erased/emptied so that they can now be written to. Valid data (LBA 10 and LBA 11) from block 412 and valid data (LBA 90) from block 414 are copied to empty block 416 which becomes block 426. Garbage collection in this case includes taking the valid data from blocks 412 and 414 and writing them to block 426. As a result, block 412 has its only valid data removed (LBA 10 and LBA 11) and is marked as obsolete in block 422. Block 422 only includes obsolete data and may be erased so new data can be written to it. Likewise, block 414 has its only valid data removed (LBA 90) and is marked as obsolete in block 424. Block 424 only includes obsolete data and may be erased so new data can be written to it. Block 418 is unchanged and includes only LBA 45 in block 428.

The garbage collection in state 2 results in two blocks 422, 424 that are empty rather than having four blocks that include a mixture of good/valid data and obsolete data. Garbage collection may attempt to free up the maximum number of blocks, so that those free blocks are then available to be written to. For example, if there were a state 3 to FIG. 4, blocks 422 and 424 could be erased and either of those blocks could be written to with new data. In other words, garbage collection can group together valid data and group obsolete data. When a block includes only obsolete data, it can be erased so that new data can be written to that block. Garbage collection is used to maximize storage in blocks by minimizing the number of partially used blocks.

As described below, defragmentation during garbage collection includes grouping logically related sectors in an attempt to generate full blocks rather than focusing on maximizing the number of empty blocks as with traditional garbage collection.

Figure 6:
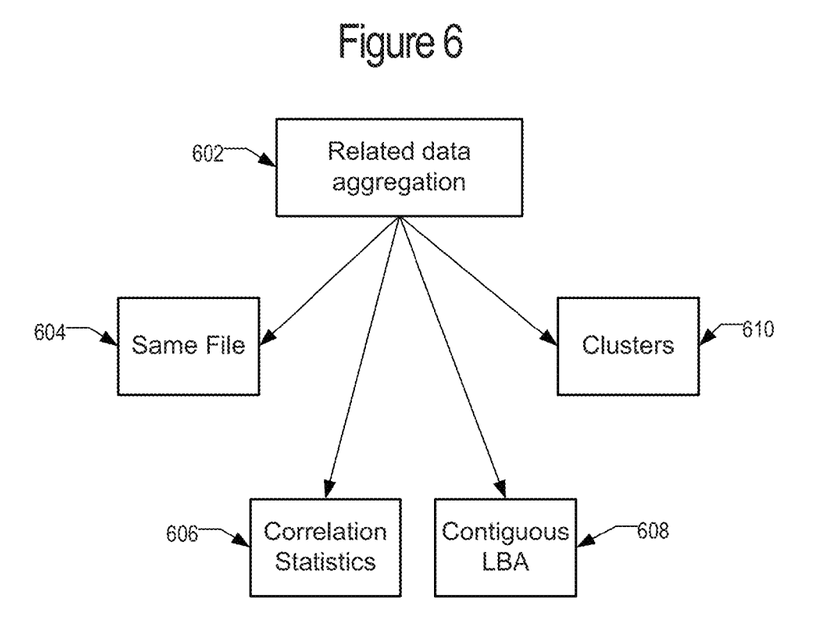
FIG. 6 illustrates exemplary techniques for identifying related data.

FIG. 5 illustrates defragmentation during garbage collection. In FIG. 5, State 0 and State 1 are similar to FIG. 4. In particular, an instruction for writing LBA 55 is received and block 406 is erased to create an empty block 416. In alternative embodiments, a garbage collection operation may be initiated with the receipt of another instruction, such as a copy or delete instruction, in addition to a write instruction. Alternatively, garbage collection may be initiated without receiving any particular instruction for modifying the memory. With the presence of the empty block, LBA 55 may be written. Garbage collection is used for consolidating obsolete data and consolidating valid data. FIG. 5 illustrates an example where LBA 10, LBA 11, and LBA 45 are all related pages. Alternatively, LBA 10, LBA 11, and LBA 45 may be referred to as logically linked sectors. FIG. 6 illustrates exemplary techniques for identifying related or logically linked pages, as discussed below. In FIG. 5, the garbage collection occurs by LBA 10 and LBA 11 being copied to block 506 as illustrated. Block 506 was formerly the empty/erased block 416 and block 412 included both valid and obsolete data. New page LBA 55 is written to empty block 416 as shown in block 506, in addition to copied pages LBA 10, LBA 11, and LBA 45. In this example, LBA 10, LBA 11, and LBA 45 are copied to the same block because they are related or logically linked. Conversely, in FIG. 4, LBA 90 was written to block 426 rather than LBA 45. When defragmentation is performed during garbage collection, related or logically linked sectors are identified and copied together. Accordingly, block 504 in FIG. 5 includes LBA 90, whereas block 424 in FIG. 4 was emptied because LBA 90 (rather than LBA 45) was copied to the empty block. Since LBA 45 is copied to block 506, block 508 includes only obsolete data in state 2.

Comparing state 2 of FIG. 5 with state 2 of FIG. 4, there are still two blocks with only obsolete data that can be erased to receive new data. The difference between FIGS. 4 and 5 is that LBA 45 was copied in FIG. 5 rather than LBA 90 in FIG. 4. FIG. 5 illustrates that defragmentation or the identification of related data may be used during garbage collection to group related data. As described, the defragmentation includes aggregating groups of logically linked sectors into the same block.

FIG. 4 may illustrate the example where LBA 90 is related to LBA 10 and LBA 11, which is why those three pages were copied into the same block. Conversely, in FIG. 5, LBA 45 is related to LBA 10 and LBA 11, so those three pages are copied to the same block. LBA 90 in FIG. 5 is not related to LBA 10, LBA 11, or LBA 45. In alternative embodiments, the new data LBA 55 may or may not be related to the other contents of the block that is first written to. In addition to analyzing or identifying related valid data, the new data to be written may also be analyzed for a potential correlation with the valid data.

FIG. 6 illustrates exemplary techniques for aggregating related data. As described, data aggregation that occurs when pages are combined into the same block may also be referred to as defragmentation. Defragmentation generally refers to reorganizing files/data on a disk so that the parts of each file are stored in contiguous sectors on the disk. The aggregation of related data described herein may be referred to as defragmentation, which may occur at the memory system 102 rather than the host system 100. FIG. 6 illustrates the identification of related data for the aggregation. In particular, the exemplary techniques illustrated in FIG. 6 may be used to identify that LBA 10, LBA 11, and LBA 45 are all related pages in FIG. 5.

When related or logically linked sectors or data are located together in a single block, the different pages may not need to be read separately from the flash memory. For example, reading one page may put the entire block in random access memory (RAM), such that a request for another page from the same block would not require an additional read operation to the flash memory since the block with the other page is already in RAM. In other words, when logically linked sectors are aggregated, the host can read ahead the other sectors/data from a particular block. This results in improved access speed by having the most relevant files in RAM and reducing the number or requests to the flash memory.

As in block 604, data that relates to the same file is logically linked, so any data that is from the same file may be aggregated during data collection. If data relates to the same file then there is a logical link between the data. For example, if someone were to delete the file then it will delete the file's data in all the pages. Accordingly, there is increased efficiency in putting data which is logically linked into the same physical block because if you delete the file for that data, then a full block is deleted rather than needing to delete data from many partial blocks if the data was fragmented. In one embodiment, as files are being written, they may be marked or tagged such that the data for a particular file can be identified as belonging to the same file. For example, a context identifier (ID or contextID) may be used for telling the flash controller that the data which has been written is part of the same file. When the host writes a file, it may give the memory device a command to open a context or a session that is associated with a contextID. Any write commands related to that file are marked with that contextID. The memory device can identify the contextID and recognize that it represents a particular file. When the host finishes writing the file, it may close the context and that contextID is free for future contexts or sessions.

In another embodiment, the memory device may understand the file system and be familiar with the File Allocation Table (FAT). When the host updates a file and writes to an LBA which is related to that file the card may know which file it is associated with because it knows the FAT.

As in block 606, data that is statistically correlated would be logically linked. For example, the frequency and/or times that data is accessed may be recorded and used to determine when data is likely to be related. Data that is accessed together is more likely to be related. In one embodiment, the memory device may monitor the order in which the host accesses particular LBA's. For example, if every time after the host accesses LBA X it then accesses LBA Y and then LBA Z the card may mark those LBA's as logically related. The memory device may monitor a series of 4 or 8 LBA.

In block 608, related data may be identified by the LBA address. If the flash memory is not segmented the file may be stored with data that is addressed using contiguous LBA addresses/numbers. Accordingly, data with the closest LBA addresses may be from the same family or would be more likely to be related. Accordingly, during garbage collection files with similar, sequential, or contiguous LBA addresses should be aggregated together as part of the defragmentation.

In block 610, the data may be organized into clusters. A file or data may be organized into clusters, so the flash device may aggregate in groups of clusters instead of groups of pages or sectors. Data within a cluster may be related, so it may be aggregated together.

In one embodiment, related data is identified and aggregated by multiple techniques, including the techniques illustrated in FIG. 6. For example, the first technique may be checking for data in the same file to identify related data that should be aggregated together. The second technique may be the statistical correlation. Finally, after the first two techniques are used, the LBA addresses may be used for aggregation. In other words, the same file analysis of block 604 may have the highest priority and performed first. Unrelated data that remains after the same file analysis may then be analyzed by the correlation statistics of block 606 to identify additional relationships not found through the same file analysis. Finally, the LBA numbering in block 608 and/or the cluster analysis in block 610 may be used to analyze the unrelated data that was not identified as related by either the same file analysis or the correlation statistics analysis.

Figure 7:
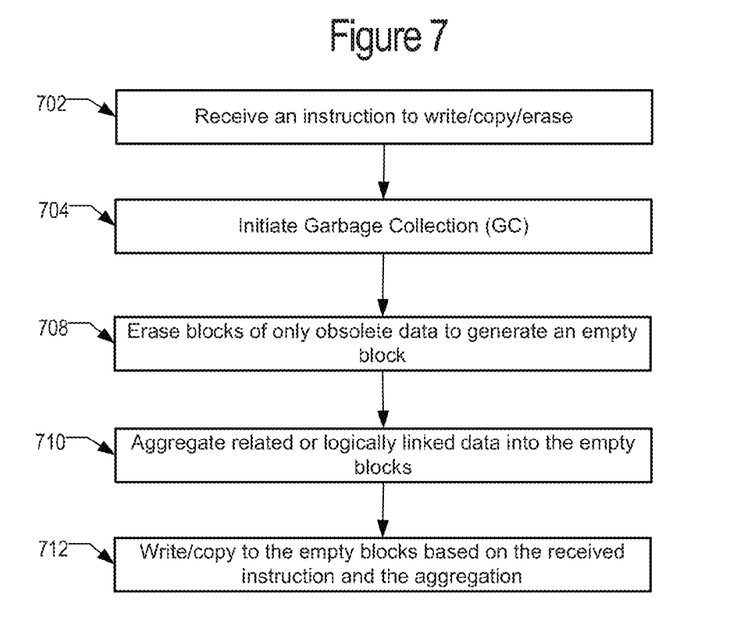
FIG. 7 is a flow diagram illustrating a method for defragmentation during garbage collection.

FIG. 7 is a flow diagram illustrating a method for defragmentation during garbage collection. In block 702, the memory system may receive an instruction. That instruction may initiate a writing, copying, and/or deleting process. Alternatively, although FIG. 5 illustrates a write command initiating the process, the instruction may be an instruction to initiate garbage collection, such as during a standby period. As part of the process, an empty and erased block may be needed to be written to. In block 704, the garbage collection process may be utilized to identify an empty and erased block and to further combine and consolidate data. Garbage collection may operate as described above with respect to FIGS.

4-5. As part of the garbage collection, obsolete data may be consolidated (e.g. blocks 422, 424 in FIG. 4 and blocks 422 and 508 of FIG. 5) and the blocks that include only obsolete data may be erased to create an empty block as in block 708. Conversely, the aggregation of the obsolete data may be as a result of the aggregation of the valid data. In other words, for blocks with a mixture of valid/obsolete data, the valid data is aggregated by being removed from those mixed blocks and the mixed blocks are left with only obsolete data. In block 708, the empty blocks (blocks with only obsolete data) may be erased so that they may have valid data written to them. This operation may occur at any point during or before the garbage collection. The empty blocks may also be referred to as being free. Valid data that is disposed in a block with stale data may be aggregated with other valid data as part of the garbage collection operation. In block 710, the aggregation of valid data may consider a relationship or correlation of the valid data to be moved. The aggregation of valid data in block 710 may result in more blocks with only obsolete data that can be erased as in block 708. In block 712, valid data to be aggregated will be written/copied with related data whenever possible. In other words, as part of the garbage collection process, the valid data that is to be copied will be copied into empty blocks with related valid data. Whether valid data is related may be determined as described with respect to FIG. 6.

Figure 8:
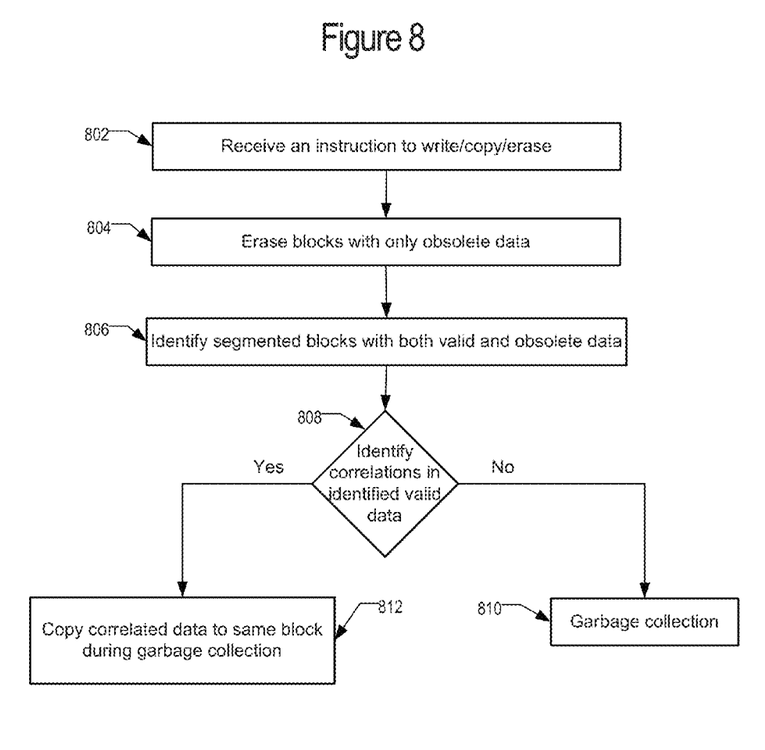
FIG. 8 is a flow diagram illustrating an alternative method for defragmentation during garbage collection.

FIG. 8 is a flow diagram illustrating an alternative method for defragmentation during garbage collection. In block 802, an instruction is received for a write, copy, or erase operation. In block 804, blocks with obsolete data may be erased so there is an empty block for the write and/or copy operation. In block 806, blocks with both valid data and obsolete data may be identified. This may be a part of the garbage collection operation. In block 808, correlations may be identified for the identified and segmented valid data from different blocks. Valid data that is present in a block with obsolete data may be referred to as segmented valid data or just segmented data. Standard garbage collection may occur in block 810 when there are no known or identified correlations. In block 812, the garbage collection may aggregate valid data that is correlated as identified in blocks 806-808. The result of this aggregation is blocks that include valid data that is related.

A "computer-readable medium," "machine readable medium," "propagated-signal" medium, and/or "signal-bearing medium" may comprise any device that includes, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical connection "electronic" having one or more wires, a portable magnetic or optical disk, a volatile memory such as a Random Access Memory "RAM", a Read-Only Memory "ROM", an Erasable Programmable Read-Only Memory (EPROM or Flash memory), or an optical fiber. A machine-readable medium may also include a tangible medium upon which software is printed, as the software may be electronically stored as an image or in another format (e.g., through an optical scan), then compiled, and/or interpreted or otherwise processed. The processed medium may then be stored in a computer and/or machine memory.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

I claim:

1. A method for memory operation in a memory system with a controller, the method comprising:
   initiating a garbage collection operation, wherein the garbage collection operation includes identifying valid data that is stored with obsolete data in a block;
   determining, as part of the garbage collection operation, any correlations between the identified valid data to be copied, wherein the determining comprises:
      determining whether the identified valid data is part of a same file, wherein any of the valid data that is part of the same file is correlated;
      utilizing, for valid data that is not determined to be correlated by being in the same file, correlation statistics for the non-correlated valid data to determine which of the identified valid data is correlated; and
      determining, for valid data that is not determined to be correlated by being in the same file or from correlation statistics, logical block addresses of the non-correlated valid data and determining that the valid data whose logical block addresses are sequential or contiguous are correlated; and
   aggregating, based on the determined correlations, the identified valid data to be copied, wherein the aggregation includes combining correlated data in the block during garbage collection.

2. The method of claim 1 wherein the memory comprises non-volatile storage including a flash memory or a solid state memory.

3. The method of claim 1 wherein each block comprises a plurality of pages whose data is erasable together.

4. The method of claim 3 wherein the garbage collection further comprises:
   combining obsolete data into blocks that only include obsolete data; and
   erasing the blocks with only obsolete data to generate empty blocks.

5. The method of claim 1 wherein the logical block addresses are sequential or contiguous when the valid data is organized in a cluster.

6. The method of claim 5 wherein the cluster is a mechanism for organization of the valid data.

7. The method of claim 1 wherein the correlation statistics determine correlation by predicting when the valid data is accessed together.

8. The method of claim 7 wherein the correlation statistics suggest a correlation based on an order that the valid data is accessed.

9. The method of claim 5 wherein the correlation is determined when the logical block addresses of the valid data are clustered.

10. The method of claim 1 further comprising:
    receiving a data write command, wherein the garbage collection operation is initiated upon receiving the data write command.

11. The method of claim 10 wherein the garbage collection comprises:
    generating an empty block on which new data from the data write command can be written; and
    aggregating existing valid data on the empty block with the new data when the existing valid data is determined to be correlated.

12. A memory system comprising:
    a non-volatile storage having an array of memory blocks storing data that is associated with logical block address (LBA) addresses; and
    a controller in communication with the blocks, the controller configured to:
       receive a write instruction for data to be written;
       identify blocks that include both valid data and obsolete data;
       determine relationships within the valid data from the identified blocks, wherein the determination of relationships is first based on whether the valid data is part of a same file, and when the valid data is not part of the same file, the determination of relationships is based on whether correlation statistics suggest a relationship based on when the valid data is accessed together; and
       aggregate the valid data from the identified blocks into a new block based on the determined relationships.

13. The memory system of claim 12 wherein the valid data that is identified as related is aggregated into the empty block.

14. The memory system of claim 12 wherein the aggregation of valid data is part of a garbage collection operation.

15. The memory system of claim 14 wherein the garbage collection comprises the controller configured for:
    generating an empty block on which new data from the data write instruction can be written;
    aggregating existing valid data on the empty block with the new data when the existing valid data is identified as related.

16. The memory system of claim 12 wherein the determination of a relationship further comprises, when the valid data is not part of the same file or related based on the correlation statistics, analyzing the logical block addresses of the valid data such that the logical block addresses that are sequential or contiguous indicate relationships.

17. The memory system of claim 16 wherein the determination of a relationship comprises the controller being configured for:
    determining whether the valid data is part of a same file, wherein the valid data that is part of the same file is related;

utilizing, for valid data that is not determined to be related by being in the same file, correlation statistics for the non-related valid data to determine which of the valid data is related; and determining, for valid data that is not determined to be related by being in the same file or from correlation statistics, logical block addresses of the non-related valid data and determining that the valid data whose logical block addresses are sequential or contiguous are related.

18. A method for operating a memory system having a controller and blocks of memory, the method comprising:

identifying blocks that include both valid data and obsolete data;

analyzing the blocks that include both valid data and obsolete data to identify the valid data in those blocks that is correlated based on correlation statistics, wherein the correlation statistics include an analysis of a frequency and an order that the valid data is accessed to determine which of the valid data is correlated; and aggregating the valid data, wherein the aggregation includes combining the valid data that is correlated.

19. The method of claim 18 further comprising:

receiving an instruction for writing new data or modifying existing data; and initiating a garbage collection operation, wherein the garbage collection operation comprises the aggregation of the correlated valid data, and the garbage collection further comprises aggregating obsolete data into a block and erasing blocks with only obsolete data to generate empty blocks.

20. The method of claim 19 further comprising:

writing the new data from the instruction into an empty block; and identifying valid data that correlates with the new data to be written to the empty block with the new data.

* * * * *